United States Patent
Matsushita et al.

(10) Patent No.: US 6,594,220 B1
(45) Date of Patent: Jul. 15, 2003

(54) VOLUME HOLOGRAPHIC MEMORY AND OPTICAL INFORMATION RECORDING/REPRODUCING APPARATUS

(75) Inventors: Hajime Matsushita, Tsurugashima (JP); Tomomitsu Kouno, Tsurugashima (JP); Hideki Hatano, Tsurugashima (JP); Yoshihisa Itoh, Tsurugashima (JP); Satoru Tanaka, Tsurugashima (JP); Takashi Yamaji, Tsurugashima (JP); Fumitaka Kotaka, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/396,663

(22) Filed: Sep. 15, 1999

(30) Foreign Application Priority Data

Sep. 17, 1998 (JP) .............................. 10-263227
Mar. 30, 1999 (JP) .......................... 11-088098

(51) Int. Cl.[7] ................................................. G11B 7/00
(52) U.S. Cl. ....................................................... 369/103
(58) Field of Search .............................. 369/103, 112.1, 369/112.15, 121

(56) References Cited

U.S. PATENT DOCUMENTS 5,425,016 A * 6/1995 Sutker .......................... 369/103
5,638,193 A * 6/1997 Trisnadi et al. ............. 369/103
6,101,161 A * 8/2000 Yang ............................ 369/103

FOREIGN PATENT DOCUMENTS

JP         55-117122   *   9/1980   ................. 369/103

OTHER PUBLICATIONS

English abstract of Japanese Patent Laid–Open Publication No. 5–142979.
English abstract of Japanese Patent Laid–Open Publication No. 10–097174.

* cited by examiner

Primary Examiner—Nabil Hindi
(74) Attorney, Agent, or Firm—Pitney, Hardin, Kipp & Szuch LLP

(57) ABSTRACT

A volume holographic memory for recording three-dimensional distribution of interference fringes generated owing to interference between signal light and reference light is provided, wherein the volume holographic memory is formed into a cylindrical shape. Also an optical information recording/reproducing apparatus is provided which incorporates an interference-fringe generating unit for generating interference fringes formed owing to interference between signal light and reference light; a storage unit for storing three-dimensional distribution of the interference fringes generated by the interference-fringe generating unit; a detecting unit for detecting diffracted light obtainable from the storage unit by irradiating the storage unit with reference light; and a reproducing unit for reproducing signal light from diffracted light detected by the detecting unit, wherein the storage unit is constituted by a volume holographic memory having a cylindrical shape.

10 Claims, 8 Drawing Sheets

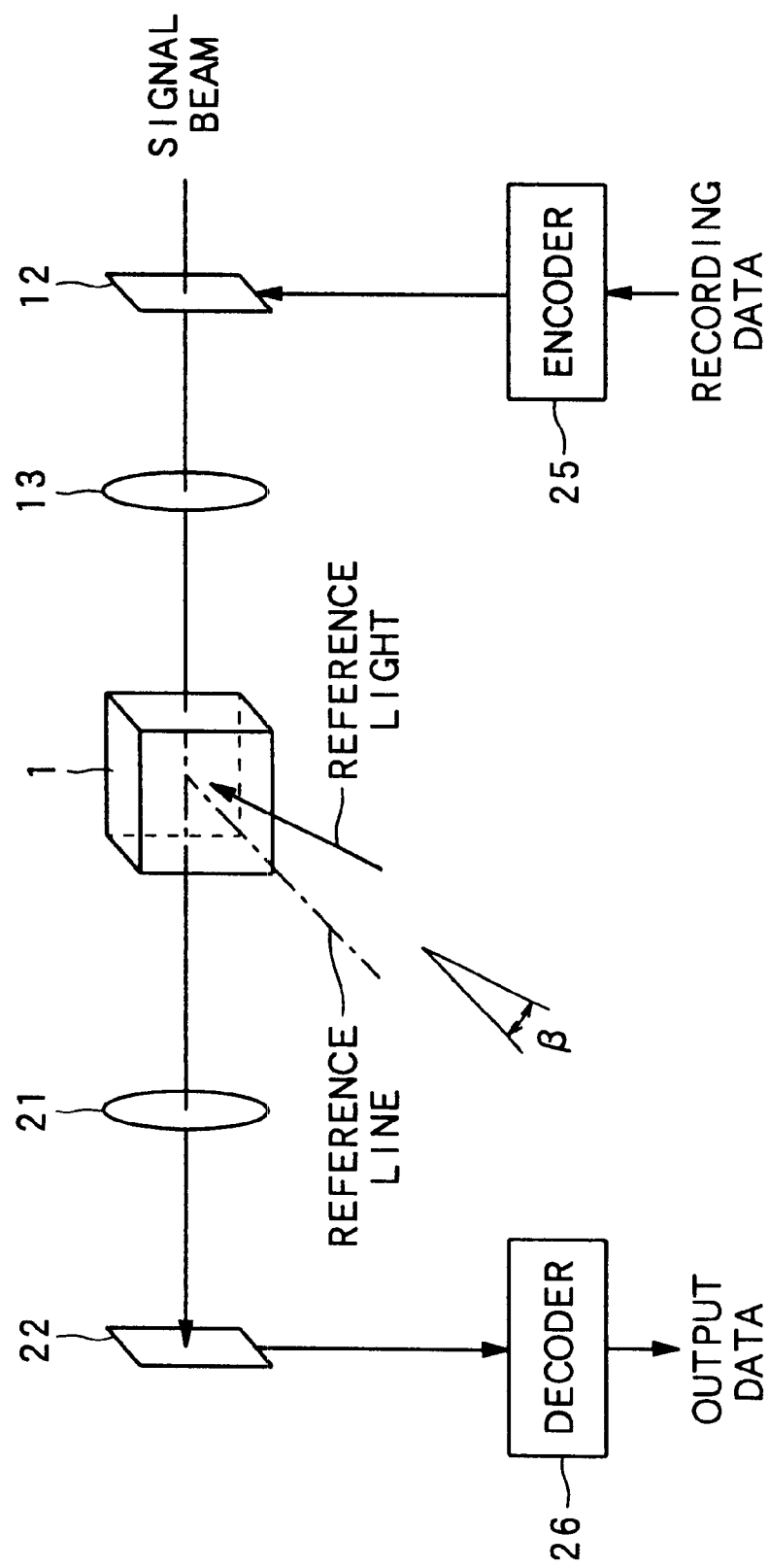

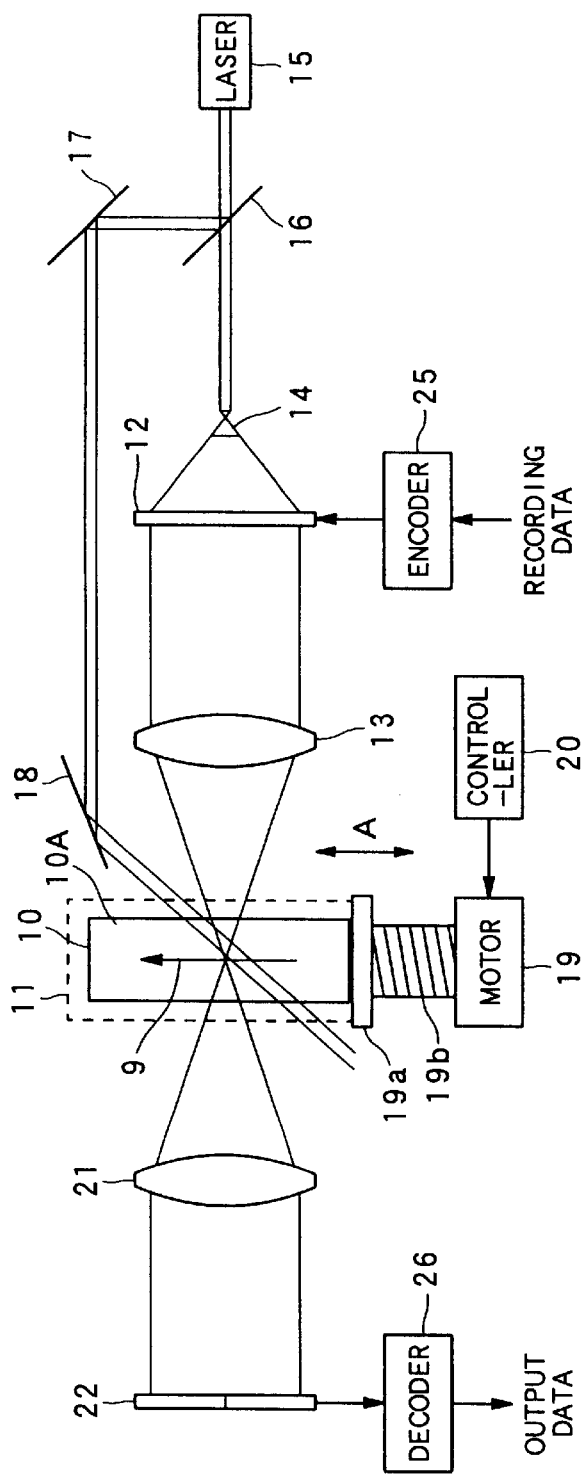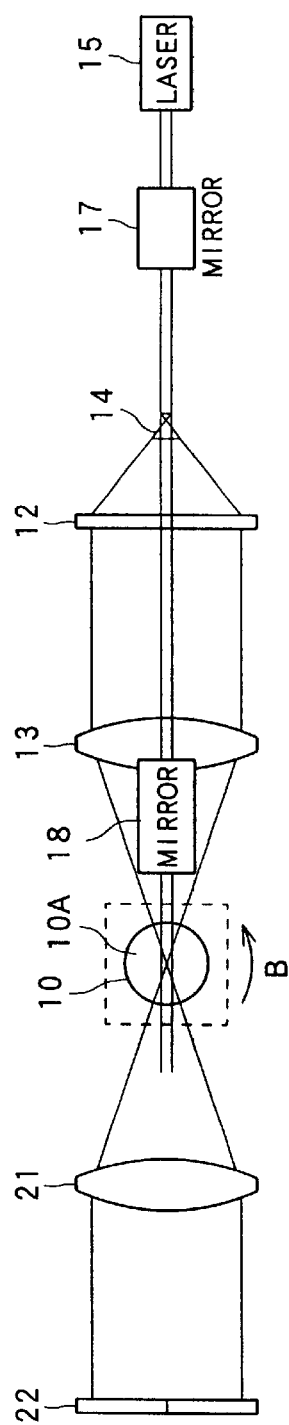
FIG. 2A
FIG. 2B

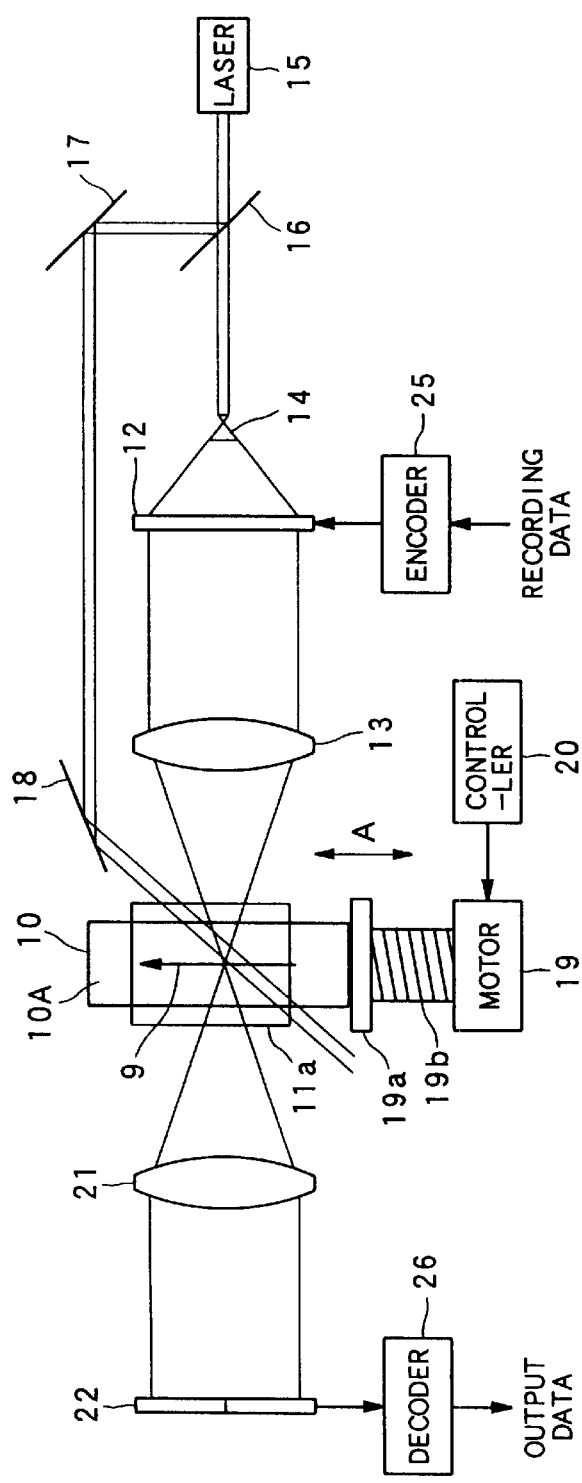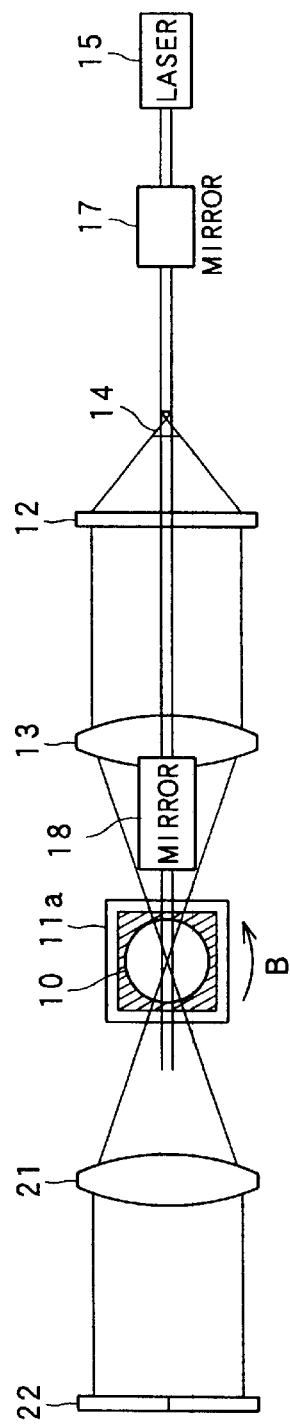
FIG. 3A
FIG. 3B

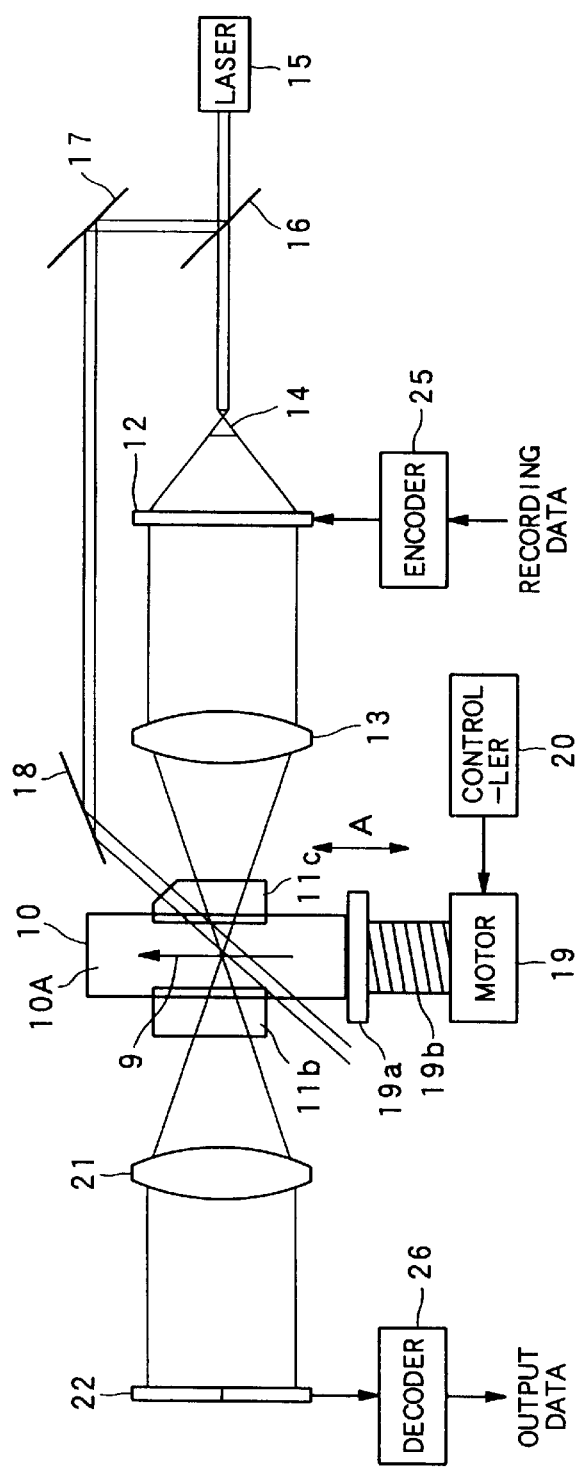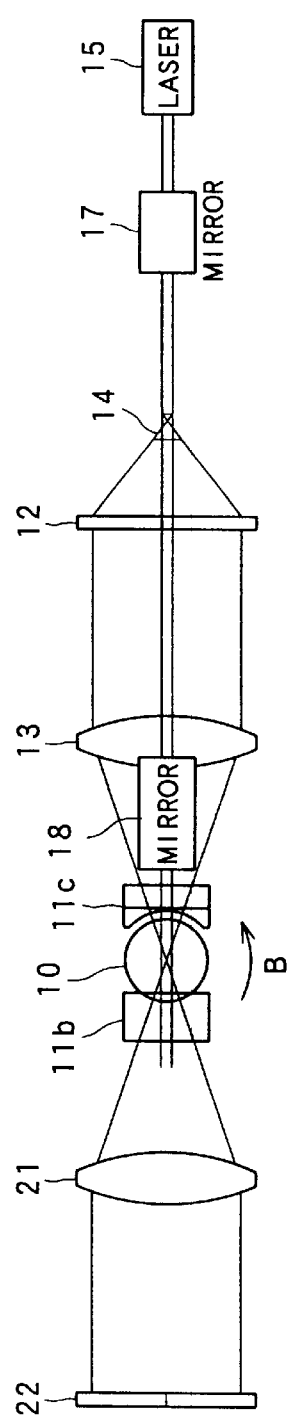
FIG. 4A
FIG. 4B

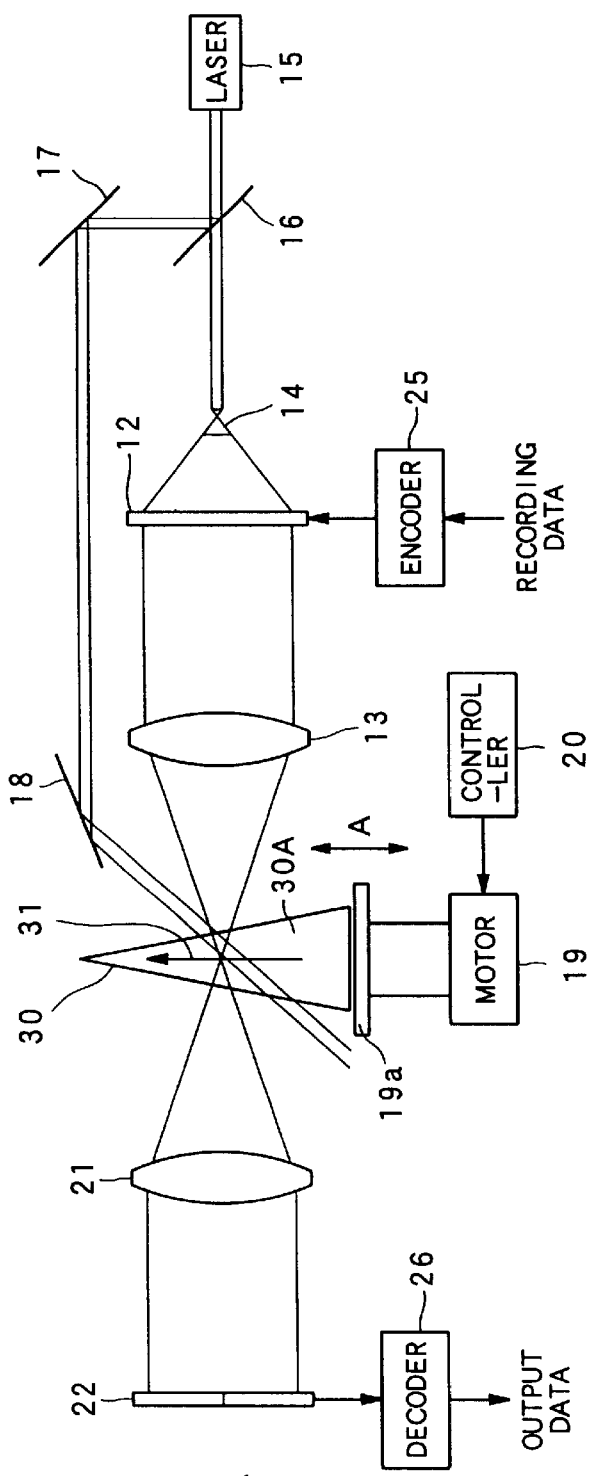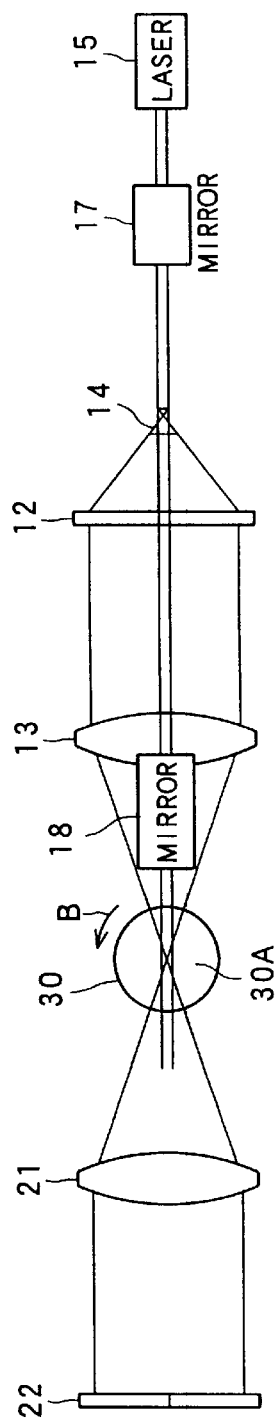
FIG. 8A
FIG. 8B

VOLUME HOLOGRAPHIC MEMORY AND OPTICAL INFORMATION RECORDING/REPRODUCING APPARATUS

BACKGROUND OF THE INVENTION

1. Field of the Invention

The present invention relates to a volume holographic memory and an optical information recording/reproducing apparatus incorporating the volume holographic memory.

2. Description of the Related Art

A holographic memory system has been known as a digital recording system to which the principle of holography is applied. The holographic memory system is a system for recording/reproducing digital data with respect to a holographic memory medium (for example, a photorefractive crystal member, such as $LiNbO_3$). The holographic memory system is able to record/reproduce data in units of two-dimensional plane pages. Moreover, the holographic memory system is able to perform a multiple recording operation using a plurality of pages. A structure that the memory medium is formed into a three-dimensional shape, such as a rectangular parallelopiped, to enable a three-dimensional recording operation to be performed is called volume holographic memory (Hereinafter, it is referred to as a "volume holographic memory" or simply referred to as a "recording medium".). The general outline of the volume holographic memory system will now be described with reference to FIG. 1.

Referring to FIG. 1, an encoder 25 produces unit-page series data by sorting data to be recorded on a volume holographic memory medium 1, into data corresponding to two-dimensional plane pages, for example, 640 bits wide by 480 bits high data array. The unit-page series data is transmitted to a SLM (Spatial Light Modulator) 12.

The SLM 12 has a modulating process units whose size is 640 bits wide by 480 bits high. Each of the modulating process units corresponds to the unit page. The SLM 12 light-modulates an applied signal beam in accordance with unit-page series data transmitted from the encoder 25. Then, the SLM 12 introduces the modulated beam (called "signal light") into a lens 13. Specifically, the SLM 12 responds to a logical value "1" of the unit-page series data, which is an electric signal to permit passing of the signal beam. On the other hand, the SLM 12 responds to a logical value "0" to cut the signal beam off. Thus, electro-optic change of unit-page data according to the contents of each bit can be achieved. As a result, a modulated signal beam serving as signal light for the unit-page series can be produced.

Signal light is made incident on the recording medium 1 through the lens 13. In addition to signal light, reference light is made incident on the recording medium 1 such that angle β (hereinafter called "incident angle β") is made from a predetermined reference line perpendicular to the optical axis of the signal beam.

Signal light and reference light interfere with each other in the recording medium 1. Produced interference fringes are recorded in the recording medium 1 so that data is recorded. When reference light is made incident at changed incident angles β to record a plurality of two-dimensional planar data items, three-dimensional recording of data is permitted.

When recorded data is reproduced from the recording medium 1, only reference light is made incident on the recording medium 1 at the same incident angle β as that employed in the recording operation. That is, signal light is not made incident as distinct from the recording operation. As a result, diffracted light obtained from the interference fringes recorded in the recording medium 1 is allowed to pass through a lens 21, and then introduced into a CCD (Charge Coupled Device) 22. The CCD 22 converts the intensity of incident light into the intensity of an electric signal to output, to a decoder 26, an analog electric signal having a level corresponding to the brightness of incident light. The decoder 26 makes a comparison between the analog signal and a predetermined amplitude (a slice level) to reproduce corresponding data "1" or "0".

The volume holographic memory medium performs a recording operation by using the two-dimensional planar data series as described above. Therefore, when the incident angle β of reference light is changed, an angle-multiple recording operation can be performed. That is, when the incident angle β of reference light is changed, a plurality of two-dimensional planes serving as recording units can be provided in the holographic memory medium. As a result, a three-dimensional recording operation can be performed.

In general, the angle-multiple recording operation system uses a pair of galvanomirrors. Angle-multiple recording of a type using the galvanomirrors has been disclosed in Japanese Patent Laid-Open No. 5-142979 and Japanese Patent Laid-Open No. 10-97174.

The galvanomirrors, however, require a large area of occupation in the system. Therefore, the overall size of the system cannot easily be smaller. What is worse, the system must have a large number of parts used. Thus, the cost cannot easily be reduced.

The limit value of the angle resolution of the galvanomirror is lower than the resolution of the holographic memory medium. Therefore, the system incorporating the galvanomirrors cannot maximally use the recording resolution of the holographic memory medium.

SUMMARY OF THE INVENTION

An object of the present invention is to provide a volume holographic memory with which the size of the storage apparatus can be reduced and dense recording can be performed.

To achieve the foregoing object, according to a first aspect of the present invention, there is provided a volume holographic memory including a recording member for recording three-dimensional distribution of interference fringes generated by interference between signal light and reference light, wherein the recording member is in a shape of a cylinder.

Thus, rotation and movement of the volume holographic memory enables multiple recording to be performed without a necessity of adjusting the angle of reference light.

In the above-stated volume holographic memory, if the optical axis of the volume holographic memory coincides with the axial direction of the recording member, rotation of the volume holographic memory around the optical axis enables spatial-multiplexing recording to be performed.

A correcting lens medium may be added to the above-stated volume holographic memory. The correcting lens is made of material having the same refractive index as that of the recording member, and it is in a shape of a rectangular parallelepiped. Furthermore, the correcting lens medium is disposed in such a manner that the recording member is placed in the correcting lens medium.

Therefore, distortion of an image occurring due to a lens effect of the cylindrical recording member can be corrected.

The correcting lens medium may be provided with: a transparent container in which the recording member is placed and which is integrated with the recording member; and a fluid substance which has the same refractive index as that of the recording member, and which is placed in a space between an outer wall of the recording member and an inner wall of the transparent container. Alternatively, the correcting lens medium may be provided with: a pair of lenses disposed to sandwich the recording member in a direction perpendicular to a central axis of the recording member. These correcting lens mediums are able to remove the lens effect of the memory.

Furthermore, a recording member in the shape of a cone may be used as a recording member of a volume holographic memory according to the present invention.

According to a third aspect of the present invention, there is provided an optical information recording/reproducing apparatus comprising: an interference-fringe generating device that generates interference fringes formed by interference between signal light and reference light; a volume holographic memory that records thereon three-dimensional distribution of the interference fringes generated by the interference-fringe generating device; a detecting device that detects diffracted light obtainable from the volume holographic memory by irradiating the volume holographic memory with the reference light; and a reproducing device that reproduces the signal light from diffracted light detected by the detecting device, wherein the volume holographic memory comprises a recording member in a shape of a cylinder.

The optical information recording/reproducing apparatus structured as described above generates interference fringes owing to signal light and reference light. The interference fringes is recorded in the volume holographic memory having the recording member in the shape of a cylinder. When a reproducing operation is performed, the volume holographic memory is irradiated with the reference light to detect diffracted light obtainable from the volume holographic memory. Then, the signal light is reproduced from diffracted light.

A first moving device and a second moving device may be added to the aforementioned optical information recording/reproducing apparatus. The first moving device moves the recording member in an axial direction of the recording member. The second moving device rotates the recording member around an axis of the recording member. As a result, spatial multiplexing recording and angular multiplexing recording can simultaneously be performed with respect to the volume holographic memory medium.

In addition, in the aforementioned optical information recording/reproducing apparatus, a recording member in the shape of a cone may be used as the recording member of the volume holographic memory.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a diagram showing the principle of the conventional volume holographic memory.

FIG. 2A is a side view of a volume holographic memory system according to a first embodiment of the present invention;

FIG. 2B is a plan view of the volume holographic memory system shown in FIG. 2A;

FIG. 3A is a side view of an example of a correcting lens medium;

FIG. 3B is a plan view of the correcting lens medium shown in FIG. 3A;

FIG. 4A is a side view of another example of the correcting lens medium;

FIG. 4B is a plan view of the correcting lens medium shown in FIG. 4A;

FIG. 8A is a side view of the structure of a volume holographic memory system according to a fourth embodiment of the present invention; and FIG. 8B is a plan view of the structure of a volume holographic memory system shown in FIG. 8A.

DETAILED DESCRIPTION OF THE PREFERRED EMBODIMENTS

Figure 5A:
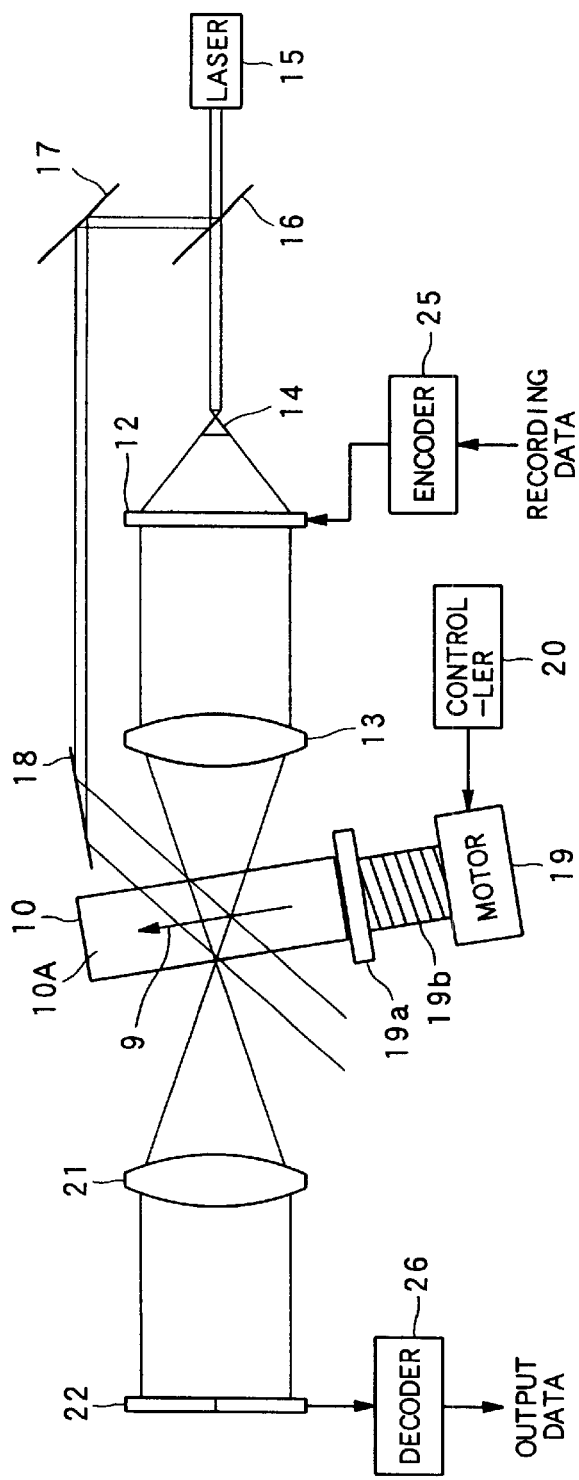
FIG. 5A is a side view of the structure of a volume holographic memory system according to a second embodiment of the present invention.

Embodiments of the present invention will now be described with reference to the drawings.

First the basic idea of the present invention will be described. The basic characteristic of the present invention lies in that a volume holographic memory medium, which has been formed into a rectangular parallelopiped, is formed into a cylindrical shape or a conical shape. When the cylindrical memory medium is rotated around the central axis, angle multiple is permitted. Furthermore, movement in the axis of rotation enables spatial multiplexing. Also, in a case of a conical memory medium, rotation around the central axis permits angular multiplexing. However the diameter of the conical memory medium is varied depending on the position of the axis of rotation. Therefore, the conical memory medium cannot perform spatial multiplexing owing to movement in the direction of the axis of rotation.

Next embodiments of the volume holographic memory medium and an apparatus for recording/reproducing the same structured on the basis of the foregoing idea will be described.

(1) First Embodiment

FIGS. 2A and 2B show a volume holographic memory medium and an apparatus for recording/reproducing the same according to a first embodiment. FIG. 2A is a side view showing the system. FIG. 2B is a plan view. As shown in FIGS. 2A and 2B, the first embodiment relates to a cylindrical volume holographic memory medium 10.

In the recording/reproducing system shown in FIGS. 2A and 2B, a laser beam emitted from a laser emitting apparatus 15 is divided into two light beams by a beam splitter 16. The light beams are transmitted to a beam expander 14 and to a mirror 17, respectively. The beam expander 14 expands the light beam transmitted from the beam splitter 16 to make the expanded light beam incident on a SLM 12. Similar to the above-mentioned SLM, the SLM 12 is a light modulator of a two-dimensional planar type having a size 640 bits wide by 480 bits high. In accordance with digital recording data, which is supplied from an encoder 25, the SLM 12 converts the light beam transmitted from the beam expander 14 into signal light.

Thus, produced signal light is converged to the inside portion of the recording medium 10 by a lens 13. In this embodiment, the lens 13 constitutes a Fourier transformation system. In the embodiment, the recording medium 10 has a recording member 10A in the shape of a cylinder. The cylindrical recording medium 10 is disposed such that the central axis of the recording medium 10 is included in a Fourier plane formed by the lens 13.

Another light beam transmitted from the beam splitter 16 is reflected by mirrors 17 and 18 so as to be made incident on the recording medium 10 as reference light. Thus, reference light interferes with signal light transmitted from the lens 13 so that interference fringes are formed. The interference between reference light and signal light is caused to occur in front of the Fourier plane or at the back of the same as a substitute for a position on the Fourier plane by disposing the optical system, such as the mirror 18 and the lens 13.

When the Fourier plane exists in the recording medium, the intensity of signal light is maximum on the Fourier plane. If 0-order light of signal light on the Fourier plane having the great intensity and reference light interfere with each other, the photorefractive effect is saturated. In this case, non-linear distortion of a recording image easily occurs. Therefore, this embodiment has the structure that reference light and signal light are caused to interfere with each other in front of the Fourier plane or at the back of the same by disposing the optical system of the system. Thus, the problem of the non-linear distortion can be prevented. As to the positional relationship between the position at which reference light and signal light interfere with each other and the position of the Fourier plane, it is determined as follows: excessive saturation occurring owing to an influence of the intensity of light on the Fourier plane is prevented by shifting the position at which reference light and signal light interfere with each other to a position in front of the Fourier plane or at the back of the same. Since diffracted light is converted toward the Fourier plane, the position of interference is the position somewhat in front of the Fourier plane or the back of the same. However, a specific amount of the shift depends on the characteristics of the employed recording medium and the optical system.

The recording medium 10 is disposed on a rotating and moving mechanism, such as a screw-feeding mechanism shown in FIG. 2A. The rotating and moving mechanism shown in FIG. 2A incorporates a motor 19 and a screw feeding mechanism 19b connected to the motor 19 and having a table 19a. The rotation of the motor 19 is controlled by a controller 20.

The recording medium 10 is disposed on the table 19a in such a manner that the optical axis (the crystal axis) of the recording medium 10 coincides with an axis of rotation of the motor 19. When the motor 19 is rotated, the recording medium 10 is moved in a direction indicated with an arrow A shown in FIG. 2A. Simultaneously, the recording medium 10 is rotated in a direction indicated with an arrow B shown in FIG. 2B. Since the recording medium 10 is moved in the direction indicated with the arrow A, the position, at which the interference fringes produced by reference light and signal light are recorded in the recording medium 10, is shifted in the direction indicated with the arrow A. Thus, spatial multiplexing recording can be realized. When the recording medium 20 is rotated in the direction indicated with the arrow B, the surface on which the interference pattern is recorded is rotated. Thus, angular multiplexing recording can be realized.

The moving mechanism according to this embodiment is structured to simultaneously perform angular multiplexing recording and spatial multiplexing recording. As an alternative to this, a moving mechanism may be employed which performs only either of the movement of the recording medium 10 in the direction of the optical axis (indicated with the arrow A) or the rotating motion (indicated with the arrow B). In this case, only either of the multiplexing operations can be performed. The selection of the moving mechanism may suitably be performed when an disposition space is limited in a case of an apparatus to which the system according to this embodiment is applied.

When the rotational speed of the rotating and moving mechanism is properly controlled, data recording/reproducing rate can be controlled. In this embodiment, the rotational speed of the rotating and moving mechanism 19 is controlled by the controller 20 so that control of the recording/reproducing speed is performed.

As an alternative to the foregoing moving mechanism, another moving mechanism which is structured to independently control the movement of the recording medium 10 in the direction of the optical axis and the rotation and movement of the same may be employed. For example, a structure in which the rotation is performed by a supersonic motor or the like and the sending movement in the direction of the optical axis is controlled by another single-axis moving stage.

When data is reproduced, the recording medium 10, in which data has been recorded as described above, is disposed on the rotating and moving mechanism similarly to the recording operation. Thus, only reference light 18 transmitted from the mirror 18 is made incident on the recording medium 10. As a result, diffracted light caused from the interference fringes recorded in the recording medium 10 is, as reproduction light, allowed to pass through a lens 21. Then, reproduction light is made incident on a CCD 22. The CCD 22 has a light receiving surface in the form of a two-dimensional plane having a size, for example, 640 bits wide by 480 bits high, similarly to the SLM 12. The CCD 22 converts supplied reproduction light into an electric signal to output the electric signal to a decoder 26. The decoder 26 compares the supplied electric signal with a predetermined slice level so as to output binary digital data.

A correcting lens medium will now be described. According to the present invention, the cylindrical recording medium 10 is employed so that the recording capacity is considerably enlarged as compared with the structure incorporating the conventional rectangular parallelepiped recording medium. Since the recording medium is formed into the cylindrical shape, the recording medium serves as a cylindrical lens. Thus, there arises a problem in that diffracted light is distorted. If the CCD or the like for receiving diffracted light is not formed into a spherical shape corresponding to the distortion, a cylindrical lens or the like is needed to correct the distortion.

A most simple solving method is employment of a structure in which the recording medium 10 is accommodated in a correcting lens medium having the same refractive index as that of the recording medium 10 and having a cubic or rectangular parallelopiped shape. That is, the recording medium 10 formed into the cylindrical shape is completely covered with the correcting lens medium. Thus, the recording medium 10 is integrated with the correcting lens medium. As a result, a cubic or rectangular parallelopiped medium having a single refractive index is apparently formed. Therefore, the lens effect of the cylindrical recording medium 10 can be corrected. In a case of a shape except for the cubic and the rectangular parallelopiped, the correcting lens medium is formed into a shape for furthermore preventing the lens effect (the apparent focal distance is elongated). Thus, the foregoing problem can be solved. An example of the shape of the foregoing correcting lens medium is indicated with a dashed line 11 shown in FIGS. 2A and 2B.

An example of the structure of the correcting lens medium will now be described. Referring to FIGS. 3A and 3B, the correcting lens medium is formed into a rectangular parallelopiped transparent container 11a which surrounds the cylindrical recording medium 10. The transparent container 11a is secured with respect to the recording medium 10 and integrated with the same. Therefore, when the rotating and moving mechanism 19 performs the rotation and movement, the recording medium 10 and the transparent container 11a are integrally rotated and moved. An internal space formed by the inner wall of the transparent container 11a and the outer wall of the recording medium 10 is filled with liquid or fluid having the same refractive index as that of the recording medium 10. That is, liquid or fluid in the internal space and the recording medium 10 are made contact with each other. Therefore, if the position of the recording medium 10 with respect to the transparent container 11a is somewhat deviated, a rectangular parallelopiped having a uniform overall refractive index can be formed. The internal space may be filled with, for example, CARGILLE refractive index liquids (series EH-1). As a result, the transparent container 11a and the recording medium 10 inserted into the transparent container 11a form a rectangular parallelopiped having a uniform overall refractive index. Therefore, the foregoing lens effect can be corrected.

FIGS. 4A and 4B show another example of the correcting lens medium. The example shown in FIGS. 4A and 4B has a structure that the correcting lens medium is constituted by a pair of lenses 11b and 11c each of which is formed into a cylindrical lens. The lenses 11b and 11c are mediums having the same refractive index as that of the recording medium 10. As a result, the lens effect of the cylindrical recording medium 10 can be removed. Each of the lenses 11b and 11c is formed of a medium, such as lithium niobate to which MgO has been added, which has a low photorefractive sensitivity to prevent exertion of an influence on recording of information in the recording medium 10. Each of the surfaces of the lenses 11b and 11c opposite to the recording medium 10 has a curvature which is substantially the same as that of the outer surface of the recording medium 10. Moreover, the lenses 11b and 11c are disposed opposite to the outer surface of the recording medium 10 such that the lenses 11b and 11c are made slight contact with the outer surface of the recording medium 10 in a range which permits the rotation of the recording medium 10 or a slight gap is formed.

As described above, according to this embodiment, the recording medium is formed into the cylindrical shape. The cylindrical recording medium is rotated and moved to perform angular multiplexing recording and spatial multiplexing recording. As a result, dense recording can be performed. Since the mechanism for rotating and moving the recording medium has a simple structure as compared with the conventional optical system, such as the galvanomirror, which changes the angle of reference light, size and cost reduction can easily be realized.

In the foregoing embodiment, the optical axis (equivalent to "crystal axis") of the recording medium 10 is made to face upwards. If the foregoing optical axis is coaxial with the axis of rotation of the rotating and moving mechanism, the foregoing optical axis may face downwards.

(2) Second Embodiment

Figure 5B:
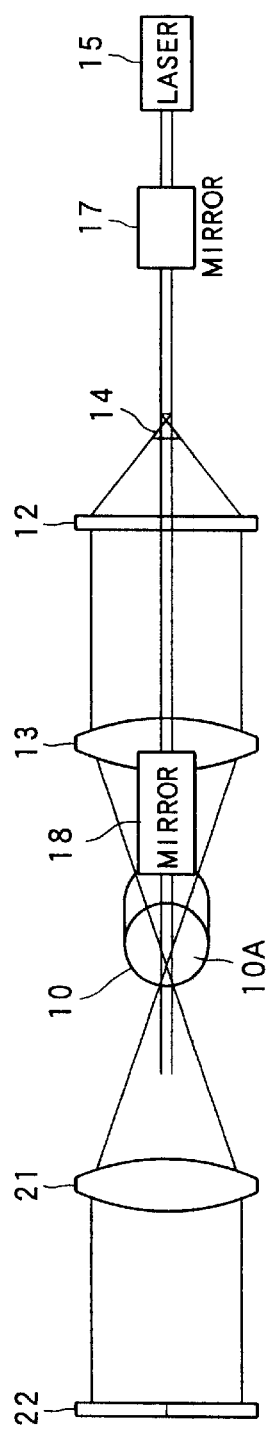
FIG. 5B is a plan view of the volume holographic memory system shown in FIG. 5A.

A second embodiment will now be described with reference to FIGS. 5A and 5B. Similarly to the first embodiment, the second embodiment is structured to incorporate the cylindrical recording medium 10. Also the basic structure of the system for recording/reproducing the cylindrical recording medium 10 is similar to that of the first embodiment. The following structures are different from the first embodiment.

The recording medium 10 is disposed in such a manner that the optical axis (the crystal axis) of the recording medium 10 is not included in the Fourier plane. As a result, non-linear distortion caused from great intensity of light on the Fourier plane can be prevented. Specifically, as shown in FIGS. 5A and 5B, the optical axis of the recording medium 10 is shifted from the Fourier plane, that is, the position of the focal point of the lens 13. The angle made between signal light and reference light is properly determined so that an influence of reflection and scattering caused from the edges of the recording medium 10 is prevented. Moreover, recording can be performed by maximally using the volume of the recording medium.

Figure 6:
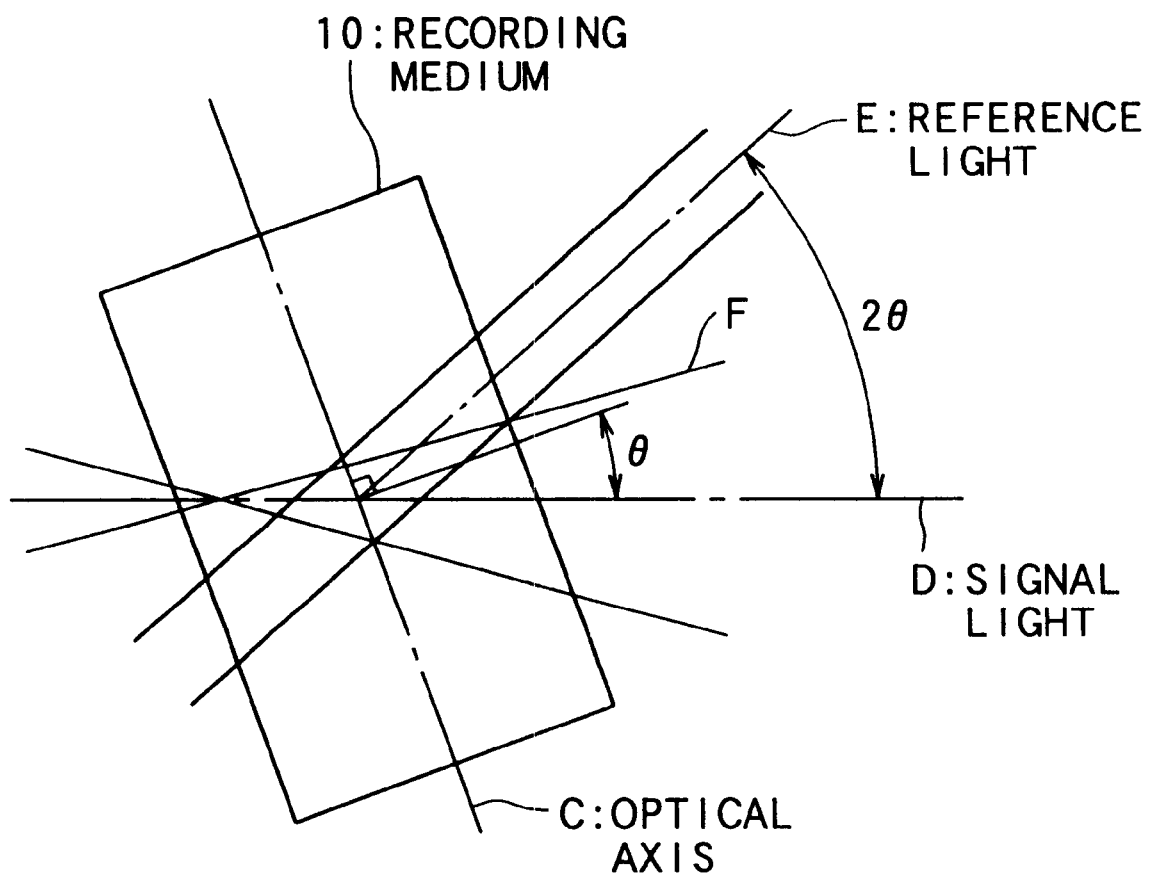
FIG. 6 is a diagram showing an example of the position of a memory medium according to the second embodiment.

Moreover, this embodiment is structured such that the optical axis of the recording medium 10 is inclined from the optical axis of signal light by a predetermined angle. FIG. 6 is enlarged view showing a portion in the vicinity of the recording medium 10. Since the recording medium 10 is inclined as described above, the volume of a portion (a portion on which interference fringes formed by reference light and signal light are recorded) of the recording medium 10 which is used to record data can be enlarged. Therefore, it is preferable that the inclination of the recording medium 10 is determined such that when an assumption is made that the angle made between reference light E and signal light D is $2\theta$, the angle made between an axis F perpendicular to the optical axis C of the recording medium 10 and signal light D is $\theta$, as shown in FIG. 6.

The other structures are similar to those according to the first embodiment. Therefore, the similar structures are omitted from description. Similarly to the first embodiment, this embodiment also requires the correcting lens medium. When the rotating and moving mechanism is employed in the second embodiment, the second embodiment is enabled to perform angular multiplexing recording and spatial multiplexing recording.

(3) Third Embodiment

Figure 7A:
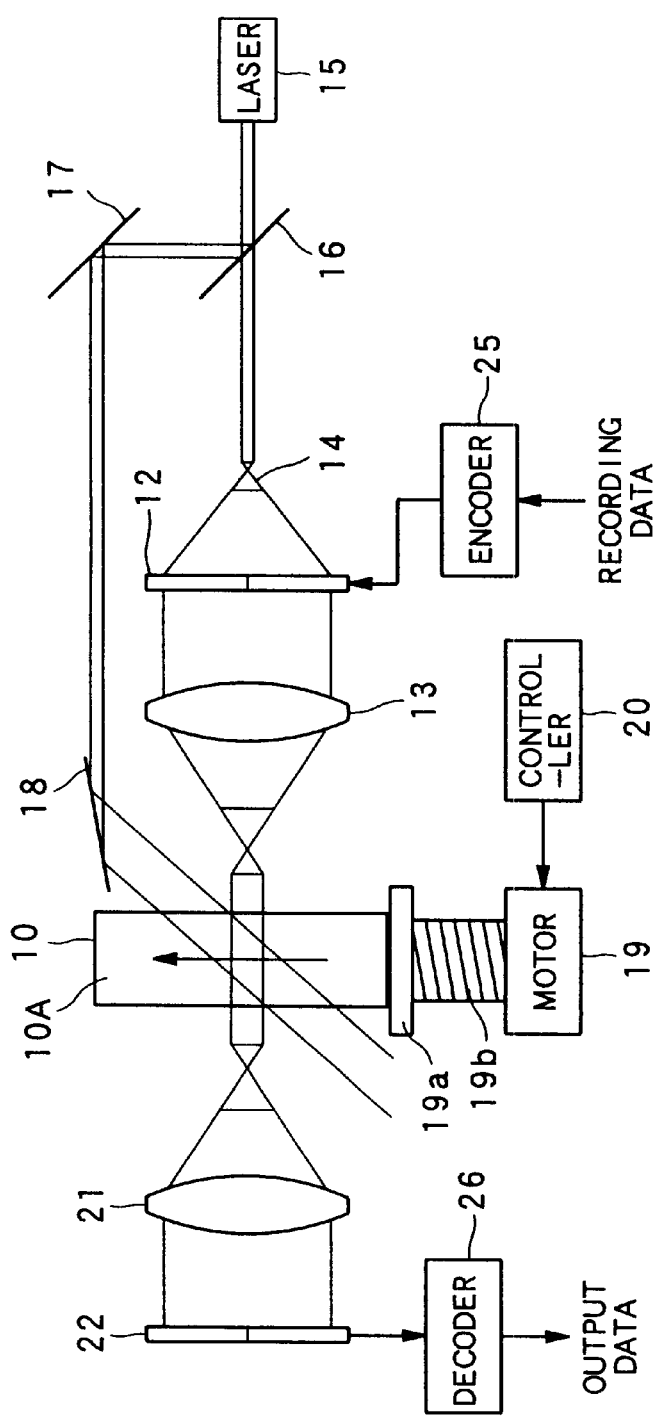
FIG. 7A is a side view of the structure of a volume holographic memory system according to a third embodiment of the present invention.
Figure 7B:
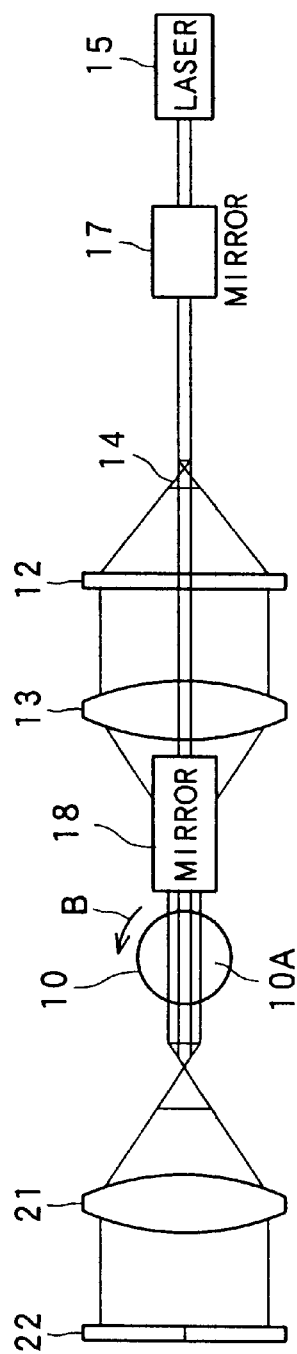
FIG. 7B is a plan view of the structure of the volume holographic memory system shown in FIG. 7A.

FIGS. 7A and 7B show a recording medium according to the third embodiment of the present invention and a system for recording/reproducing the recording medium. FIGS. 7A and 7B each show a system incorporating an image hologram system to which the cylindrical recording medium according to the present invention is applied. The system is constituted such that the distance from the SLM 12, which emits signal light, to the recording medium 10 is made to be shorter than the Fourier transformation system. The recording medium of the image hologram system is enabled to prevent existence of an intense light portion similar to the Fourier plane when two-dimensional planar data is designed. Therefore, the above-mentioned problem of the non-linear distortion does not arise. As a result, the overall portion in the direction of the diameter of the recording medium can be used to perform recording of interference fringes. As a result, angle resolution can be improved to more than two times of the angle resolution which can be realized in the first embodiment. If a rotating and moving mechanism having a higher resolution is employed, denser recording is permitted.

The third embodiment is structured similarly to the first embodiment except for the structure that the optical systems, such as the lenses and the mirrors, and the recording medium 10 are disposed to constitute the image hologram system. Thus, the rotating and moving mechanism is employed to perform angular multiplexing recording and spatial multiplexing recording.

(4) Fourth Embodiment

Next a fourth embodiment of the present invention will be described. The fourth embodiment is structured such that the shape of the recording medium is formed into a conical shape, as shown in FIGS. 8A and 8B. The optical system of the system according to this embodiment employs the Fourier transformation system similar to that according to the first embodiment. The structure of the system is basically similar to that according to the first embodiment.

As shown in FIGS. 8A and 8B, the recording medium 30 has a recording member 30A in the shape of a cone. Since the diameter of the conical recording medium 30 varies depending on the position in the optical axis, spatial multiplexing recording cannot be performed which is realized by moving the medium in the direction of the optical axis 31 (the direction indicated by the arrow A shown in FIGS. 8A and 8B). Therefore, a recording medium 30 is rotated by a rotating mechanism which performs only rotating motion so that only angular multiplexing is performed. Since the recording/reproducing operations are performed similarly to the first to third embodiments, the description of the foregoing operations is omitted. When the conical recording medium is adapted to the correcting lens medium similarly to that according to the first embodiment, the lens effect of the recording medium can be canceled.

Although the conical recording medium has a recording capacity smaller than that of the cylindrical recording medium, the foregoing system is an effective system when requirements for space saving and size reduction of the apparatus, on which the system according to this embodiment is mounted, are given a high priority to a requirement for a larger recording capacity.

As described above, according to the present invention, the cylindrical or conical recording medium is employed which is rotated and moved or rotated by the rotating and moving mechanism having a relatively simple structure or the simple rotating mechanism so that multiplexing recording is realized. Therefore, the size and cost can be reduced as compared with the multiplexing recording method which uses the galvanomirror or the like.

According to the present invention, the volume holographic memory medium is rotated and moved. Thus, multiplexing recording can be performed without a necessity of performing adjustment of the angle of reference light.

Furthermore, according to the present invention, the volume holographic memory medium is moved in the direction of the optical axis to enable spatial multiplexing recording to be performed.

Moreover, according to the present invention, the lens effect of the cylindrical or conical memory medium can be corrected to prevent distortion of the image.

Moreover, according to the present invention, information can be recorded/reproduced with respect to the cylindrical volume holographic memory medium.

Moreover, according to the present invention, spatial multiplexing recording and angular multiplexing recording can simultaneously be performed with respect to the cylindrical volume holographic memory medium.

Moreover, according to the present invention, information can be recorded/reproduced with respect to the conical volume holographic memory medium.

Moreover, according to the present invention, angular multiplexing recording can be performed with respect to the conical volume holographic memory medium.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Applications No. 10-263227 filed on Sep. 17, 1998 including the specification, claims, drawings and summary and No. 11-88098 filed on Mar. 30, 1999 including the specification, claims, drawings and summary are incorporated herein by reference in their entirety.

What is claimed is:

1. A volume holographic memory comprising a recording member for recording three-dimensional distribution of interference fringes generated by interference between signal light and reference light, wherein the recording member is in a shape of a cylinder and an optical axis of the volume holographic memory coincides with an axial direction of the recording member;

the volume holographic memory further comprises a correcting lens medium which is made of material having the same refractive index as that of the recording member, and which is in a shape of a rectangular parallelepiped, wherein the recording member is placed in the correcting lens medium.

2. The volume holographic memory according to claim 1, wherein the correcting lens medium comprises:

a transparent container in which the recording member is placed and which is integrated with the recording member; and a fluid substance which has the same refractive index as that of the recording member, and which is placed in a space between an outer wall of the recording member and an inner wall of the transparent container.

3. The volume holographic memory according to claim 2, wherein the fluid substance is a liquid.

4. The volume holographic memory according to claim 1, wherein the correcting lens medium comprises a pair of lenses disposed to sandwich the recording member in a direction perpendicular to a central axis of the recording member.

5. The volume holographic memory according to claim 4, wherein a surface of each of the lenses opposite to the recording member is a curved surface having a curvature which is substantially the same as that of an outer surface of the recording member.

6. A volume holographic memory comprising a recording member for recording three-dimensional distribution of interference fringes generated by interference between signal light and reference light, wherein the recording member is in a shape of a cone.

7. The volume holographic memory according to claim 6, wherein an optical axis of the volume holographic memory coincides with an axial direction of the recording member.

8. The volume holographic memory according to claim 6, further comprising a correcting lens medium which is made of material having the same refractive index as that of the recording member, and which is in a shape of a rectangular parallelepiped, wherein the recording member is placed in the correcting lens medium.

9. An optical information recording/reproducing apparatus comprising:

an interference-fringe generating device that generates interference fringes formed by interference between signal light and reference light;

a volume holographic memory that records thereon three-dimensional distribution of the interference fringes generated by the interference-fringe generating device;

a detecting device that detects diffracted light obtainable from the volume holographic memory by irradiating the volume holographic memory with the reference light; and a reproducing device that reproduces the signal light from diffracted light detected by the detecting device, wherein the volume holographic memory comprises a recording member in a shape of a cone.

10. The optical information recording/reproducing apparatus according to claim 9, further comprising a moving device that rotates the recording member around an axis of the recording member.

* * * * *